(12) United States Patent
Moström

(10) Patent No.: US 6,252,523 B1
(45) Date of Patent: Jun. 26, 2001

(54) METHOD AND A SYSTEM FOR REGISTERING VEHICLE FEES

(75) Inventor: Thomas Moström, Jönköping (SE)

(73) Assignee: Combitech Traffic Systems AB, Jonköping (SE)

( * ) Notice: Subject to any disclaimer, the term of this patent is extended or adjusted under 35 U.S.C. 154(b) by 0 days.

(21) Appl. No.: 09/297,122

(22) PCT Filed: Oct. 10, 1997

(86) PCT No.: PCT/SE97/01692

§ 371 Date: May 28, 1999

§ 102(e) Date: May 28, 1999

(87) PCT Pub. No.: WO98/18105

PCT Pub. Date: Apr. 30, 1998

(30) Foreign Application Priority Data

Oct. 24, 1996 (SE) .................................................. 9603927

(51) Int. Cl.[7] ...................................................... G08G 1/00
(52) U.S. Cl. ........................... 340/928; 340/905; 235/384; 701/117
(58) Field of Search ..................................... 340/928, 925, 340/539, 901; 235/382, 384, 380, 379; 701/117

(56) References Cited

U.S. PATENT DOCUMENTS

| | | | |
|---|---|---|---|
| 4,303,904 | 12/1981 | Chasek | 340/937 |
| 4,739,328 | 4/1988 | Koelle et al. | 340/937 |
| 5,757,286 | 5/1998 | Jonsson et al. | 340/937 |
| 5,805,082 | * 9/1998 | Hassett | 340/928 |

FOREIGN PATENT DOCUMENTS

| | | |
|---|---|---|
| 4410450 | 9/1995 | (DE) . |
| 4426292 | 2/1996 | (DE) . |
| 2248957 | 4/1992 | (GB) . |
| WO 94/27256 | 11/1994 | (WO) . |

* cited by examiner

*Primary Examiner*—Daryl Pope
(74) *Attorney, Agent, or Firm*—Pollock, Vande Sande & Amernick, R.L.L.P.

(57) ABSTRACT

A method and system for registering vehicle fees by means of radio communication between stationary toll collection facilities in a toll border (1, 2) of a main zone and communication equipments in passing vehicles when making predetermined checking operations such as for securing the authority of the vehicle equipment. Within the main zone a number of radio transmitters are arranged, which transmit data carrying signals relating to additional fees related to passing the respective transmitter. When passing in, the toll collection facilities carry out an introductory part of the checking operations and activate the vehicle equipment to register signals from the transmitters when passing them. When passing out, the registering operation is terminated including the checking operations, then summing up the registered fees and debiting the total fee. Thereby the main zone can be divided into a number of inner zones (A, B, C, 9) so that the total fee is made to be dependent on the inner zones into which the vehicle is driven and without the need for complete toll collection facilities for bidirectional communication within the main zone.

26 Claims, 1 Drawing Sheet

METHOD AND A SYSTEM FOR REGISTERING VEHICLE FEES

FIELD OF THE INVENTION

The method and the system according to the present invention are intended for registering vehicle fees such as tolls for passing roads and bridges and for staying including parking vehicles inside toll areas such as city cores, so that the fees can be debited or preferably deducted from an amount stored in a pre-paid card.

BACKGROUND OF THE INVENTION

It occurs that in toll collection facilities fees are collected for passing motor highways, bridges, tunnels and other vehicle transport passages having high construction costs. Thereby, an economic contribution to construction and maintenance costs is obtained. First, tolls were manually collected in toll booths which the vehicles must pass. Then, paying cards and gates were introduced which were temporarily opened by presenting such a card. The latest development includes that in the toll gate an installation is provided for non-contact reading of identification units on passing vehicles, so that vehicles do not have to stop. Then, usually, for the communication a microwave transceiver is used in the stationary unit and transponders in the vehicles. Then the method described in U.S. Pat. No. 4,739,328 Koelle et al. may be used. For registering the fee, an identity obtained from the vehicle unit is accessed making a debiting of the cost possible. A still more rational system is obtained in the case where the stationary unit activates registering the fee in the vehicle unit, so that the fee can be deducted from amount stored in a pre-paid card, a so-called Smart Card, with which the vehicle unit can be provided.

It also occurs that it is desired to provide heavily trafficked areas, such as city cores, with entrance toll collection facilities. In such cases the possibility of obtaining revenues is not the primary object but the most important object generally is that thereby a means is obtained of restricting the traffic in such areas by reducing "unnecessary driving" and a major reason for transferring from personal transports by private cars to public transportation services is produced. In the development of the method comprising non-contact registering of passing vehicles the interest of installing this kind of zone toll facilities has increased.

Within zones in which entrance control using fees is of interest, in addition to the problem related to dense traffic, generally parking problems also exist. It has been known for a long time to control parking by means of charges which are most often paid by means of automatic parking meters. Beside control of, in particular, long-time parking at locations placed remotely from the most frequented streets and places, some economic contribution is obtained to the installation and maintenance of the parking lots.

However, the system comprising parking meters has many disadvantages. Thus, they require a lot of staff for supervising; in order that the paying morality will be maintained and in order that the control will be efficient, each vehicle must at some intervals be checked by patrolling supervisors. Installation and maintenance as well as service of and collecting money from automatic meters have considerable costs and the parking meters often give an ugly impression in the general look of a town and in addition makes cleaning of the streets difficult. To a user they are uncomfortable to the extent that he often is uncertain of the length of the time period for which the necessary prepayment is to be made. A return too late to the vehicle results in a risk for parking fines and paying for a longer time than planned mostly results in unnecessary costs. An system alternative to parking meters includes areas or parking houses having pay desks at the exits, at which one pays for the time between entrance and exit. In some respects, this is a more versatile system. However, it can only be used to a limited extent in built-up areas, in which it mostly is necessary to arrange possibilities for parking along streets and on isolated, smaller parking lots.

SUMMARY OF THE INVENTION

The present invention is particularly directed to providing a rational system for collecting traffic fees within built-up areas, in particular areas in the center of towns or cities. These traffic fees can, according to what has been indicated above, constitute both entrance fees, which are registered for a vehicle passing the border to a toll zone, and parking charges, which are collected when placing a vehicle at an indicated car parking area, the charges mostly being dependent on time.

Often, an area in the inner portion of a town, for which it is desired to collect a toll when entering this portion, can be divided into areas in which the need and desire for restricting vehicle traffic is greater or smaller. The reasons thereof can be several, such as a larger or smaller trafficability, a larger or smaller available number of car parks or a grading of the desire of limiting disturbances from vehicle traffic, such as in areas having walkways. These circumstances result in that there is a need for dividing a toll zone for a built-up region into several subzones. A typical example can be that, starting from a city core, in which the need and desire for restricting vehicle traffic is largest, ring zones are provided, in which the need for reducing the traffic becomes smaller the longer the distance is from the core and at the same time the traffic in such outer zones cannot be too much restricted since they often need to be used for the traffic service of the core and the inner zones and for vehicles passing between areas outside the borders of the main zone. If tolls are used as a control means for restricting the traffic, it is natural for such areas, where the desire of restricting the traffic is graded, to obtain the control by taking higher tolls within areas in which the need for restricting the traffic is largest and a smaller fee for subzones such as peripheral zones. Collecting some kind of average fee, like in existing systems, for entrance over an outer zone border has appeared to be inefficient and also evokes a large resistance from the road-users. For influencing the traffic in a toll zone, relatively high fees are required but if they would be collected for already entering the border zone, for example for passing through, vehicle traffic which is not desired to be restricted to the same extent, would be charged with unreasonably high fees.

It has therefore been proposed that the considered area would be divided into subzones used in the aspect of collecting fees, by arranging toll collection facilities for passing vehicles at each zone border. The person which is to pass into the city core will then pass a number of toll collection facilities and will then be registered for a new fee for each passage through a zone in a direction inwards towards the core. However, such a system would result in providing a large number of toll collection facilities. Limiting the number of vehicles by guiding the traffic flow along some traffic routes would result in that some streets and roads would be shut off, thereby making the trafficability difficult, which is very delicate in built-up areas and which are heavily trafficked. Since toll collection facilities take a relatively large place and influence the general look of a town, this provides another reason for restricting the number of toll collection stations and, thus, also of toll borders. Thereby, the traffic control function will be reduced in order to make the installations reasonable.

The invention relates to a method and a system for collecting traffic fees, primarily both tolls and parking charges, by means of remote communication as has been described in the introductory part. The system makes a division of a main zone into subzones possible for allowing differentiated fees. The system permits the technical installations for such a system will be greatly restricted compared to the aforementioned proposed system having a number of toll collection stations for successively passing towards an inner town area. Since the installations will not in the same way as toll collecting facilities be burdening to the town environment and at the same time the installation costs will be considerably smaller, one can let the differentiation of fees and division into subzones be completely determined by the need for traffic control for relieving the pressure on the most delicate traffic areas.

BRIEF DESCRIPTION OF THE DRAWING

On the accompanying drawing a FIGURE is shown which forms a typographical survey of a toll area which is divided into subzones.

DETAILED DESCRIPTION OF THE INVENTION PREFERRED EMBODIMENT

Figure 1:
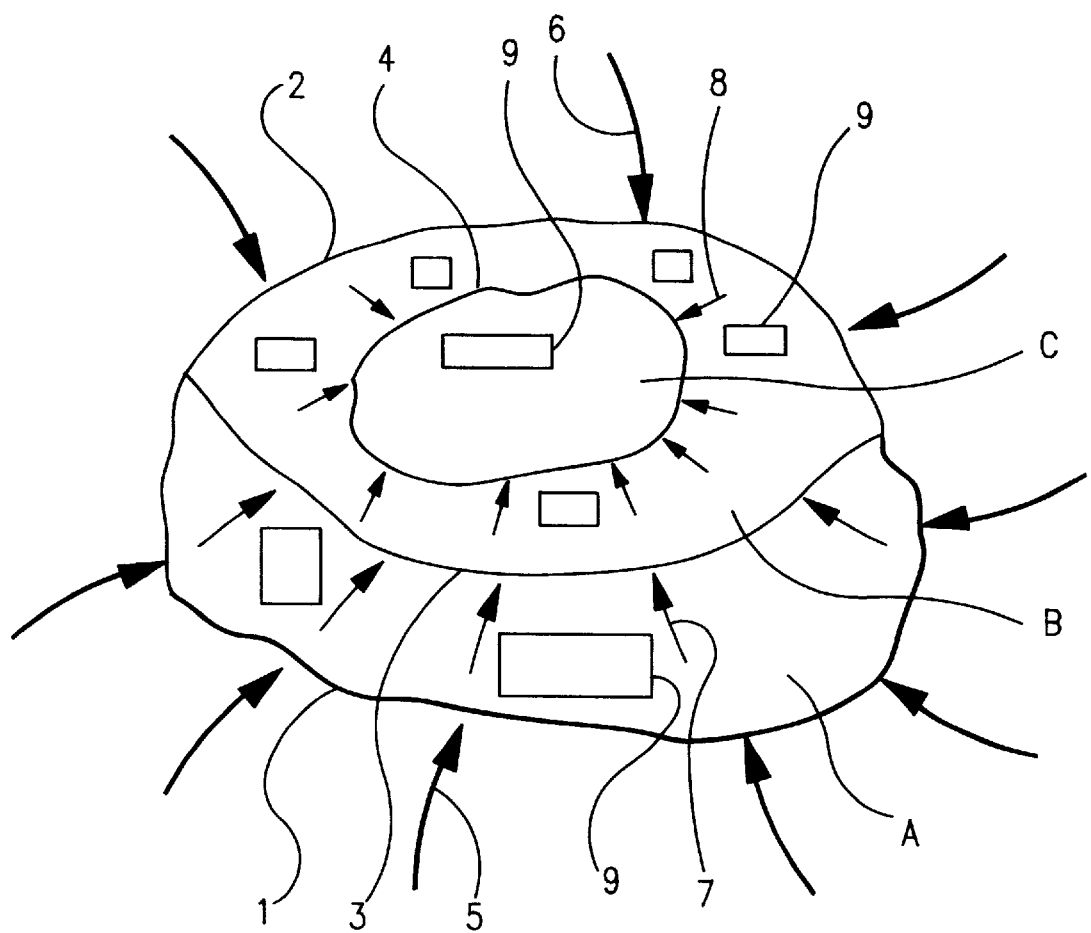

According to the FIGURE, a town area is surrounded by a toll border which has a portion 1, outwards, towards a toll-free area, and which defines a peripheral zone A, and a portion 2, which outwards limits an exterior zone B, which is also connected to the peripheral zone A at a border 3. Inside the exterior zone B, an interior zone C is arranged having a border 4 around it. The border zone A has traffic routes having relatively large capacities. It is needed both for passing into the interior zones and for passing between exterior areas on the two sides of this zone, so that not too long a detour around it has to be taken by traffic passing through. It is not desired that the exterior zone B be used for other vehicles passing through than for vehicles passing between zones A and C. However, the need for restricting the traffic in the subzones A and B is not as large in relation to the need in the zone C, in which it is desired to avoid disturbances from the traffic as much as possible and in which the trafficability is restricted, as is often the case in a city core.

The boxes 9 in the FIGURE schematically indicate car parking areas. As appears from the distribution and the sizes the supply of parking lots is largest in zone A and less in zone B and highly restricted in zone C. In a built-up area, as is assumed for zone C, actually there usually is not so large a space available for car parks. In addition, it is desired to restrict the car park areas, in order to reduce the traffic into the zone. However, in a peripheral zone like the zone A there are greater possibilities for providing car parks and, in the case where these possibilities are limited in the interior areas, there is also a larger need in neighboring outer areas, so that the accessibility of the interior zones is not restricted too much by long transport distances for which vehicles can be used only to a limited extent. Compared to the peripheral zone A the exterior zone has a limited parking space, which, however, is not as limited as in the interior zone C. Outside the toll area it is additionally suitable to arrange so-called entrance parking lots. It is then assumed that good public transportation facilities exist from the outside into the interior zones is provided.

Entrance roads to the zones, which are assumed to also be exit roads, are indicated by the arrows 5 for zone A and for zone B by the arrows 6, in respect of traffic from the outer region and 7 for traffic between zone A and B and roads 8 for traffic between, from and to the zones B and Z. Then, it appears, that the entrance roads to zone A have a relatively restricted number but they are presupposed to correspond to traffic routes having relatively high capacities. The entrance roads to zone B partly arrive from the outer area, see the arrows 6, and partly from zone A, see the arrows 7. Thus, it is presupposed herein, that the toll area can be reached both through zone A and through a direct entrance into zone B. This is only one example of the way in which zones can be arranged. Here it is presupposed that the zone A is adjacent to a more traffic intensive outer area than zone B. Like the entrance roads 5 the entrance roads 6 exist in a restricted number. In contrast, the entrance roads 7 from zone A to zone B as well as the entrance roads 8 from zone B to zone C are plural. The system according to the invention allows for these inner traffic routes, as will be demonstrated, so simple arrangements that for construction reasons the existing traffic routes do have not to be restricted to any significant extent. One can therefore schematically say that the entrance roads 7 and 8 can substantially be equal to all of the used streets and roads before introducing the toll collecting system. Thus, the system allows that no restriction of the trafficability in the inner area has to be made, this area being the most delicate as to restricting the traffic flow.

For controlling the traffic flow, the intention is now that the lowest toll should be collected when passing into zone A from the outer area, thus through the roads 5. A higher fee is collected when directly passing through the roads 6 into zone B. When passing along the roads 7 from zone A to zone B an additional fee is collected. This can be equal to, less than, or possibly larger than the difference between the tolls for passing into zone A and zone B respectively. If a lower total fee is collected when passing into zone B through zone A than when directly passing into zone B, the entrance roads 6 will be relieved if the entrance fee to zone A together with the additional fee is higher than the entrance fee through the roads 6. For passing into zone C along the roads 8, a further additional fee is then registered. By differentiating the tolls and the additional fees, large possibilities are thus obtained for controlling traffic using the fees and of providing a reasonable charge for traffic for which a restriction to a too high extent is not desired.

The mentioned system which is here presupposed for remotely registering traffic fees by means of radio communication requires a relatively complicated operation using devices for transmitting and receiving radio waves, preferably microwaves, in both the toll collection station and in the vehicle. As has been mentioned, the equipment in the vehicle for radio communication is most preferably designed as a transponder, which can receive signals from the stationary transmitter and retransmit them as a response message by modulating the received signal. In order that a payment operation will be made including full security, encryption procedures are used when exchanging successive messages. The final result will be, as has been mentioned, that the fee either is debited to a special account or is reduced from a balance of "electronic money" stored in the vehicle equipment, suitably by means of a so-called Smart Card. Such relatively complicated operations require large toll collection facilities, which have possibilities of communicating with central installations for accounting and other things. There may also exist a need for equipping them with sensing means for registering the vehicle class; the toll is actually often differentiated depending on the class of the vehicle, such as different fees being used for private cars and vehicles for transporting goods, etc. If such toll collection stations are arranged at large traffic routes having several parallel lanes and without strongly restricting the velocity through the toll collection stations, such as can be the case for entrance roads from the outer area, large installations additionally are required for checking the vehicle path through the toll collection station and for capturing unauthorized passing vehicles. Such large installations can include antennas, video cameras, and other equipment for recording the vehicle, its identity and appearance, over the roadway in a relatively large frame installation. Such toll collection stations are presupposed to be arranged at the entrance roads 5 and then also the larger installations for several traffic lanes and for a free traffic flow. Such toll collection facilities can also be required for the entrance roads 6 from the outer area. In any case, toll collection facilities are required which make all the functions possible for securing the operation and classifying passing vehicles.

It is previously known how the security and the checking operations in a complete toll collection station can be arranged. See, for example, U.S. Pat. No. 4,303,904 to Chasek. Such devices and systems are also known from Swedish patent 9303203-5 to Olsson and other documents.

It has been observed in connection with the invention that such large operations do not have to be made when passing inwards through the toll borders 3 and 4 through the entrance roads 7 and 8. For such passages the security and classifying need is already fulfilled and the vehicle equipment is activated for additional communication.

According to the invention, at the entrance roads 7 and 8, inside the outer zone border having its complete toll collection facilities, simpler and very little space consuming radio transmitter arrangements are provided. These transmitters are arranged for periodically and frequently transmitting signals for activating the vehicle equipment for registering an additional fee. Hereinafter, such transmitters are called additional transmitters. Such transmitters are also located at the entrance of the car parks for which charges are collected.

By means of the additional transmitters, the valid toll for entering from the outer area can thus be upgraded using additional fees for passing into interior zones and for parking on parking places. Since the parking charge often is dependent on time the function is such that when entering a car parking area the vehicle equipment is activated to charge for each started time period a certain charge, according to a schedule of charges valid for the car park. After the parking operation, the vehicle driver by means of an operating means activates the vehicle equipment to debit the charge as programmed by the additional transmitter for each time period until the time measurement is stopped when driving the vehicle therefrom. Alternatively, the charge per time period can be fixed and be added using a predetermined amount for each time period, the length of the time period is varied as is the case for telephone charges, for which the period charge is fixed and the period length is instead determined according to a schedule of fees.

The sequence of events when passing from the outer area through the zones A and B and into the zone C and parking there and after that exiting to the outer area will be the following:

1. Entrance in zone A through some of the complete toll collection facilities at the roads 5. Then all security and checking operations are wirelessly made between the toll facilities and the vehicle equipment. The toll is programmed into the vehicle equipment, however without being finally deducted from the balance of the equipment of "electronic money" and without being debited to the account associated with the vehicle equipment respectively.

2. When passing the following borders of the subzones, in which only additional transmitters are arranged, the vehicle equipment is initiated by means of the periodically transmitted signals from the additional transmitter, to register as an additional operation supplementing the security and checking operations made in the original passing of a toll collection station, an additional fee, which applies to passing the considered toll border. This additional fee is not registered for a final deduction of a balance or a debiting of an account, respectively.

3. When entering the parking lot again, an additional transmitter is passed. It activates the parking function in the vehicle equipment in the indicated way, thus to debit, after a manual start of the time measurement equipment, according to the schedule of parking charges which has been communicated from the additional transmitter.

4. After parking and the manual activation of the time measurement made by the vehicle driver the time depending units of the parking fee will start to be registered by the vehicle equipment, in the way which has been previously described, thus without a final reduction of a balance or debiting an account, respectively.

5. The vehicle passes out from the toll zone and then passes one of the toll collection facilities along the roads 5 or 6. In the toll collections facilities it is then registered that the original identification made when entering, according to the security and checking operations, is correct, whereupon the vehicle equipment is activated to communicate the recorded total vehicular fee, thus composed of the entrance fee, the additional fees for passing into subzones and the existing parking charges. A final operation results in that this total fee is registered and is deducted from a balance of "electronic money" or is debited to the intended account.

The final registering of fees in the complete toll collection station when passing out from the toll area is advantageous by the fact that a bi-directional communication can be made including required security routines for the registering operation. Since the additional transmitters are presupposed to be arranged for transmission only and the function thereby in the vehicle equipment only will be receiving, such a complete security procedure cannot be made there. However, it does not exclude, that the operation can be changed somewhat in relation to what has been described herein, so that for a smart card the reduction of the balance is made successively when additional fees are debited and that the operation in the toll collection station when passing out only includes a reporting of this reduction of the balance.

The described scheme presupposes that for passing out no fees are debited when passing toll borders between subzones but, in contrast, naturally, parking charges when moving between different parking lots. It means that the additional transmitters must be arranged to only influence the vehicle equipment when passing in from a zone having a lower toll but not when passing out from it. It can technically be carried out, in the case where completely different roadways for passing in and passing out, do not exist by detecting the driving direction by means of reflected radio waves, which are reflected against the vehicles. There are also other possibilities, which could be recognized by one skilled in the art.

However, one can instead of completely excluding the fee when passing out let it remain and then perhaps at a lower level than when passing in. The fact that one moves between the zones at some time intervals actually means, that one stays relatively long within the toll area, which could motivate further additional fees. A possible alternative is then that a time measurement device in the vehicle registers, besides the additional fee when passing in over a sub-zone border, also the identity of this border and then also registers the time of this passing so that when passing out an additional fee adapted in its magnitude to this staying time can be collected.

Totally, there may exist a need for registering not only the passing in and the staying on a car park in order to collect charges but also the staying time in some, particularly trafficked zones, such as city cores. However, one must then consider the fact that the staying time of some vehicles cannot partly be charged with any fees, i.e. such vehicles which have their own garage or parking places. Such a system has been proposed in Swedish patent 9303025-2 to Olsson in which the time period when the vehicle is moving is debited in addition to the parking time.

The part of this description that refers to the FIGURE indicates a strict division of the toll area in subzones having well defined borders. However, it is only an example which has been chosen for making the description of the system clear.

In an actual installation, the system according to the invention makes it possible, as has been mentioned, that a large number of additional transmitters and/or beacons are arranged. Thereby, the fee system can have considerably many more facets than the concept of "division into sub-zones" appears to indicate. Thus, the sum of the additional fees can be made dependent on not only the area into which the vehicle is driving but also on the road chosen. Thereby, a possibility is created for controlling by means of fees in addition to the choice of destination also the choice of road.

Thus, the additional transmitters have only transmission equipment for the function as described, in order to be capable of debiting additional fees the deeper a vehicle is driven into a trafficked road system. Thus, the additional transmitters constitute a kind of radio tower which in traffic context are usually called beacons. They can be arranged at some intervals along the traffic roads. The transmitters can transmit three signals to the transponder of the vehicle equipment: identity code, additional fee for driving into a zone and a schedule of parking charges. A basic fee specific for the vehicle and adapted to the vehicle class can be stored in each vehicle equipment and an additional transmitter then only transmits the proportion of the basic fee which is to be debited when passing the considered transmitter. Thus, this allows dividing an area into subzones, both for driving and parking. The fees can also be adapted according to the time of the day, so that it will, for example, be cheaper to drive in the night or at times being less burdened with traffic.

The additional transmitters can also be supplemented with stationary transmitter-receiver equipment connected to some form of central system, for example existing FreePath-networks for public traffic and emergency vehicles, which equipment has units located at strategic points. They can be designed for reprogramming the vehicle equipment and "electronic money" can also possibly be transferred from an intended account for upgrading the available balance. It can also transmit some form of warning signal to the vehicle equipment if therein some error is detected in the communication. A system of the kind as described can be extended for servicing the public traffic. The system can automatically note the time when a public traffic vehicle passes a control point and report it to a central system, which registers the position and the movements of the traffic units. Emergency vehicles can be equipped with special vehicle equipment giving a free passage past traffic lights for emergency operations.

A check of the fact that the time measurement means for counting down the parking fee has actually been activated in a parking operation can be manually made by means of parking supervisors or alternatively by means of remote sensing using the transponder of the vehicle equipment.

Thus, the basic idea of the invention is that toll collection stations for complete security and checking operations are only arranged at the entrance roads in an outer border of a toll zone. For activating additional fees when moving within this toll zone as well as for other situations charged with fees, primarily for parking on car parks, simple radio transmitter units, or "beacons", are activated for monodirectional communication with passing vehicles. These additional transmitters can have a very simple form, substantially be only a pole or be carried by already existing structures, such as lamp-posts or house walls, for example. The system thus makes it possible to obtain a very complete traffic control by differentiated charging with fees using a very simple equipment that is little noticeable within the toll zone.

What is claimed is:

1. A method of registering vehicle fees by wireless communication, comprising:

defining a main zone having an outer toll border and a plurality of inner zones having a toll border within the main zone;

providing toll collection facilities along roads at entrances to the main zone for transmitting and receiving data carrying signals;

providing a plurality of additional transmitters at entrances to the inner zones for transmitting data carrying signals;

providing a vehicle unit in a vehicle, the vehicle unit comprising a transmitter and a receiver for receiving signals from the toll collection facilities and the additional transmitters;

carrying out security and checking operations including transmitting a signal with the toll collection facilities to activate the vehicle unit and programming a toll into the vehicle unit when the vehicles pass into the main zone;

transmitting signals with the additional transmitters to the vehicle unit when the vehicle passes into one of the inner zones to register an additional fee;

terminating calculation of vehicle registration fees with the toll collection facilities when a vehicle passes out of the main zone;

summing up all data registered in the vehicle unit related to tolls and fees;

deducting the summed tolls and fees from an account associated with the vehicle, the summed tolls and fees being dependent on the number of inner zones into which the vehicle is driven.

2. The method according to claim 1, wherein the wireless communication is carried out with radio waves.

3. The method according to claim 1, wherein the predetermined security and checking operations comprise securing authority of the vehicle transmitters and receivers in relation to the toll collection facilities and for correctly registering a debiting of all of a vehicle fees according to the payment operation.

4. The method according to claim 1, wherein the main zone shares a border with at least one inner zone.

5. The method according to claim 1, wherein selected inner zones have associated time dependent additional fees, wherein when the vehicle enters one of the selected inner zones the vehicle unit receives a signal from an additional transmitter located at an entrance to the selected inner zone for starting a countdown in the vehicle unit and when the vehicle exits the selected inner zone the vehicle unit receives a signal from an additional transmitter located at an exit of the selected inner zone for terminating the countdown, wherein the toll collection facilities calculate and charge an additional time dependent fee based upon the start and stop of the countdown when the vehicle passes the toll border of the main zone.

6. The method according to claim 5, wherein the selected inner zones are parking facilities.

7. The method according to claim 5, wherein the vehicle unit includes means for sensing whether the vehicle is moving or stationary and means for terminating the countdown of time during periods when the sensing means senses that the vehicle is stationary.

8. The method according to claim 1, wherein calculating the additional fees comprises:
   transmitting data related to a unit of calculation adapted to passage through a zone; and
   combining in the vehicle unit each unit of calculation with a unit of calculation determined for a type of vehicle thereby forming a value representing an additional fee adapted to a schedule of fees of a passed through zone and to the type of vehicle.

9. The method according to claim 1, wherein the vehicle unit comprises a smart card including a programmed money balance from which summed tolls and fees are deducted.

10. The method according to claim 9, wherein when passing one of the toll collection facilities upon exiting from the main zone over the outer toll border data associated with collection and deduction of the summed tolls and fees are transferred to the toll collection facilities and have checked according to established security and checking operations.

11. A system for registering vehicle fees by wireless communication, the system comprising:
   a plurality of stationary toll collection facilities arranged in a number of passing roads along an outer toll border of a main zone;
   a plurality of additional transmitters at entrances to inner zones within the main zone for transmitting data carrying signals;
   a vehicle unit in a vehicle, the vehicle unit comprising a transmitter and a receiver for receiving signals from the toll collection facilities and the additional transmitters;
   wherein the toll collection facilities and the vehicle unit are arranged to carry out successive communications resulting in a staying operation and making predetermined security and checking operations, the toll collection facilities are arranged to carry out an introductory part of the security and checking operations and to activate the vehicle unit so that the vehicle unit will register data regarding additional fees related to passage into one of the inner zones when receiving signals from the additional transmitters, the toll collection facilities are arranged such that when the vehicle passes out of the main zone the toll collection facilities terminate the paying operation including the security and checking operations by summing up all data recorded in the vehicle unit in respect of fees and debiting the total fee, the paying operation being partially carried out as the vehicle passes the additional transmitters.

12. The system according to claim 11, wherein the security and checking operations comprise securing authority of the vehicle unit in relation to a considered toll collection facility and registering a debiting of a vehicle fee according to the paying operation.

13. The system according to claim 11, wherein the wireless communication is carried out with radio waves.

14. The system according to claim 11, wherein the main zone shares a border with and an inner zone.

15. The system according to claim 11, wherein the vehicle unit is arranged to make a calculation of an additional fee by basing it on a unit of calculation received from one of the additional transmitters and related to passing the additional transmitter and a unit of calculation relating to the class of the vehicle in a predetermined schedule of type classes.

16. The system according to claim 11, wherein selected inner zones comprise car parks and the additional transmitters arranged at entrances to the car parks activate a parking function in the vehicle unit and the additional transmitters arranged at exits to the car parks deactivate the parking function.

17. The system according to claim 16, wherein the parking function is time dependent, and the vehicle unit comprises time measurement means for counting down elapsed time after activation of the parking function and until the deactivation thereof is made, the vehicle unit registering a corresponding additional fee calculated using a unit of calculation associated with the car park and a unit of calculation related to the time counted down.

18. The system according to claim 17, wherein the additional fee is calculated also using a unit of calculation relating to the class of the vehicle.

19. The system according to claim 11, wherein the main zone and the inner zone comprise driving roads, and at entrances to the main zone or an inner zone the additional transmitters are arranged to activate a timing function in the vehicle unit and at exits from the main zone or inner zone transmitters are arranged to deactivate the timing function, the additional fee being calculated using a unit of calculation related to the schedule of fees for the main zone or inner zone and a unit of calculation related to the staying time in the zone.

20. The system according to claim 19, wherein the additional fee is calculated also using a unit of calculation related to a class of the vehicle.

21. A system according to claim 11, wherein the vehicle unit comprises means sensing movement of the vehicle and counts down a period of time that the vehicle remains in a zone only during a time that the sensing means senses movement of the vehicle.

22. The system according to claim 11, wherein selected inner zones have associated time dependent additional fees, wherein when the vehicle enters one of the selected inner zones the vehicle unit receives a signal from an additional transmitter located at an entrance to the selected inner zone for starting a countdown in the vehicle unit and when the vehicle exits the selected inner zone the vehicle unit receives a signal from an additional transmitter located at an exit of the selected inner zone for terminating the countdown, wherein the toll collection facilities calculate and charge an additional time dependent fee based upon the start and stop of the countdown when the vehicle passes the toll border of the main zone.

23. The system according to claim 22, wherein the selected inner zones are parking facilities.

24. The system according to claim 22, wherein the vehicle unit includes means for sensing whether the vehicle is moving or stationary and means for terminating the countdown of time during periods when the sensing means senses that the vehicle is stationary.

25. The system according to claim 11, wherein the vehicle unit further comprises a smart card including a programmed money balance from which summed tolls and fees are deducted.

26. The system according to claim 11, wherein when passing one of the toll collection facilities upon exiting from the main zone over the outer toll border data associated with collection and deduction of the summed tolls and fees are transferred to the toll collection facilities and are checked according to established security and checking operations.

* * * * *